United States Patent [19]
Nimylowycz

[11] 3,759,469
[45] Sept. 18, 1973

[54] PARACHUTE ARRANGEMENT
[75] Inventor: Osyp Nimylowycz, Philadelphia, Pa.
[73] Assignee: The United States of America as represented by the Secretary of the Army, Washington, D.C.
[22] Filed: Nov. 6, 1972
[21] Appl. No.: 303,897

[52] U.S. Cl. .............................. 244/149, 244/142
[51] Int. Cl. ............................................ B64d 17/00
[58] Field of Search .................... 244/139, 140, 142, 244/146, 147, 149, 152

[56] References Cited
UNITED STATES PATENTS

| | | | |
|---|---|---|---|
| 2,699,306 | 1/1955 | Ambear | 244/149 |
| 3,521,840 | 7/1970 | Ainslie | 244/142 |
| 3,010,685 | 11/1961 | Stencel | 244/147 |
| 1,840,618 | 1/1932 | Castner | 244/146 |
| 3,291,423 | 12/1966 | Britton | 244/149 |
| 3,138,348 | 6/1964 | Stahmer | 244/147 |
| 2,486,403 | 11/1949 | Hattan | 244/152 |
| 3,281,098 | 10/1966 | Stencel et al. | 244/149 |

Primary Examiner—George E. A. Halvosa
Assistant Examiner—Edward R. Kazenske
Attorney—Harry M. Saragovitz et al.

[57] ABSTRACT

A parachute arrangement having a hydraulic parachute spreader positioned internally of the canopy skirt and connected at one end by a lanyard to the canopy apex. An initiator firing pin mounted in the lower end of the spreader is connected by a firing lanyard to a load when deployed, such that upon operation of the drogue chute the initiator will ignite a propellant charge in the spreader to eject liquid coolant through peripherally spaced lateral orifices in the spreader sidewall against the skirt to facilitate a quick opening thereof.

4 Claims, 3 Drawing Figures

PATENTED SEP 18 1973 3,759,469

PARACHUTE ARRANGEMENT

The invention described herein may be manufactured, used, and licensed by or for the Government for governmental purposes without the payment to me of any royalty thereon.

This invention relates to parachute apparatus and more particularly to a parachute arrangement in which a rapid opening of the canopy skirt is facilitated.

It is an object of the invention to provide a rapid opening parachute arrangement in which potentially hazardous parachute inversions are prevented.

Another object of the invention is to provide such an arrangement which is simple and economical to produce.

A further object of the invention is to provide such an arrangement having a centrally positioned hydraulic spreader which will not hinder normal aerodynamic parachute inflation should the spreader misfire.

These and other objects, features and advantages will become more apparent from the following description and accompanying drawings in which.

Figure 1:
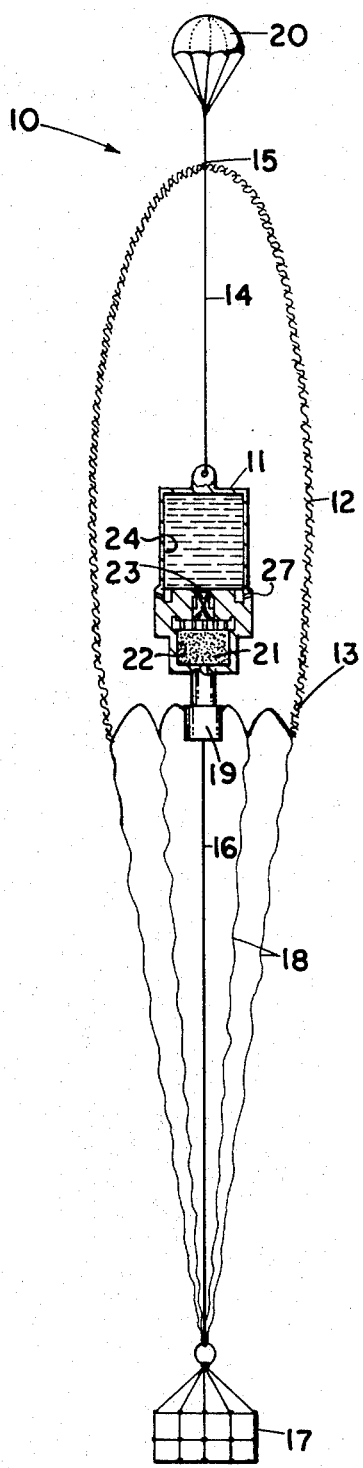
FIG. 1 is an elevational sectional view of a parachute arrangement prior to actuation of the hydraulic spreader and embodying the principles of the invention.

The parachute arrangement, shown generally at 10 (FIG. 1), has a hydraulic parachute spreader or generator 11 suspended by lanyard 14 from the apex 15 of parachute canopy 12 to center or be normally positioned within the canopy skirt portion 13. The lower end of hydraulic spreader 11 is appropriately attached by a firing lanyard 16 to a predetermined load 17, for example cargo under delivery or the harness of an ejected aircraft occupant. When taut, the firing lanyard 16, which is of less length than each of the suspension lines 18 that connect the canopy skirt portion 13 to the load 17, actuates a sear pin of an initiator 19 in a manner to be described upon operation of the drogue chute or drogue gun 20 which is affixed to the canopy apex 15 externally of the parachute 12. The effective or total taut length of the firing lanyard 16, spreader unit 11 and lanyard 14 is less than those of each of the suspension lines 18 and their corresponding collapsed parachute canopy length at the moment the drogue chute 20 opens.

Figure 2:
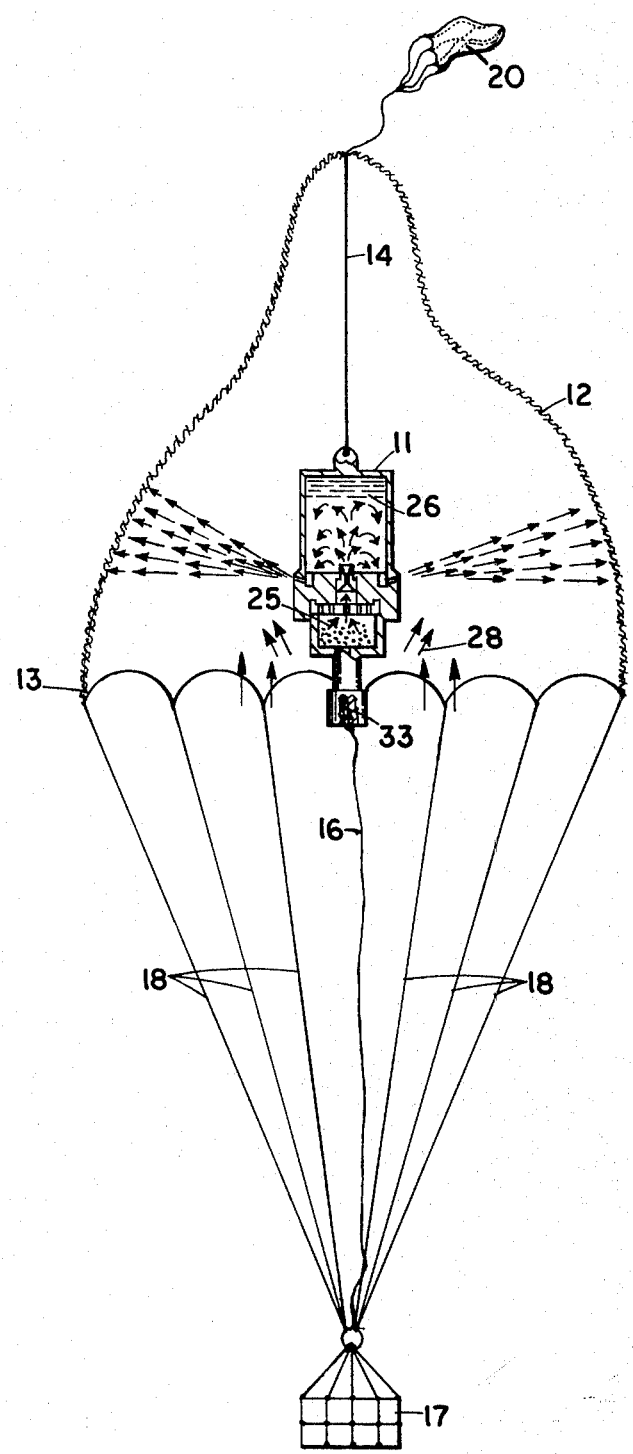
FIG. 2 is a view similar to FIG. 1 after actuation of the hydraulic spreader.
Figure 3:
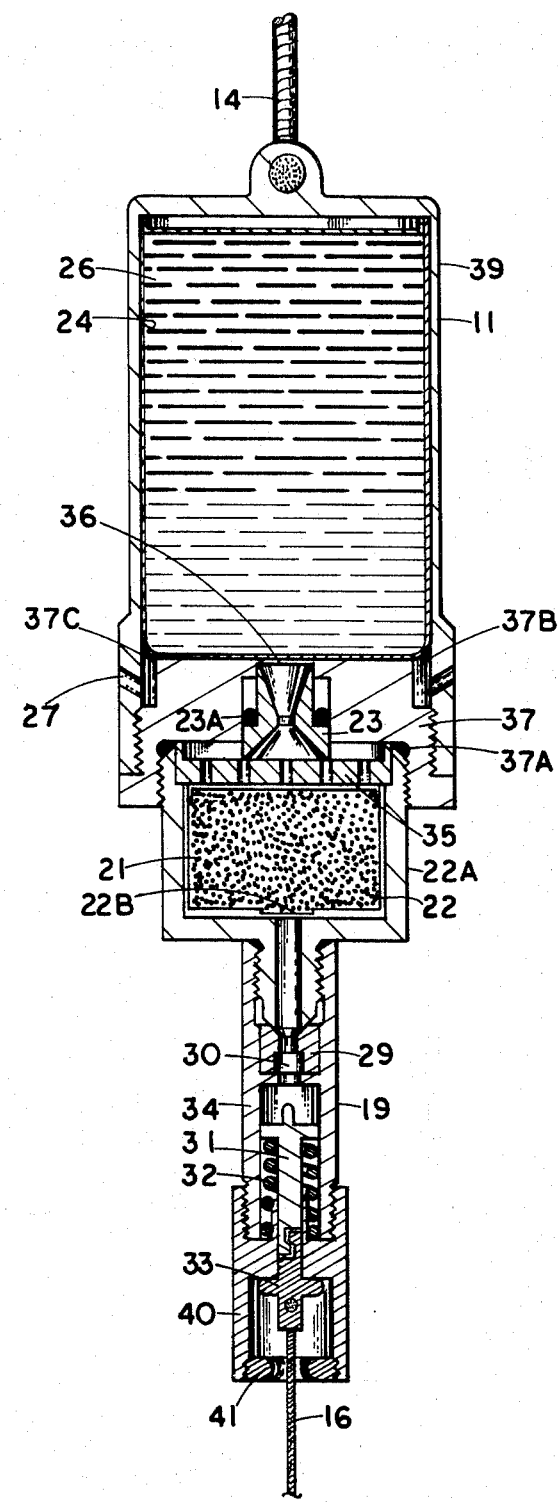
FIG. 3 is an enlarged sectional view of the hydraulic spreader of FIG. 1.

The initiator 19 ignites the propellant charge 21 contained in the cylindrical aluminum propellant cartridge 22 and which upon burning exhausts through the orifice of nozzle 23 into the cylindrical coolant cartridge 24. The hot gases 25 (FIG. 2) from the burning propellant charge pressurize and force the liquid coolant 26 out of its chamber through the peripherally spaced lateral openings 27 provided in the sidewall of the spreader 11. The pressurized fluid ejecting out ports 27 is directed radially towards the parachute skirt 13. The coolant 26 mixed with gases 25 together with entrained surrounding air 28 force open the parachute skirt 13, thus rapidly opening or inflating the parachute 12.

The preferred hydraulic parachute spreader or generator unit 11 has a firing initiator or mechanism 19 that contains a centrally apertured aluminum primer seat 29 for percussion primer 30 adjacent its internally threaded upper end that upon assembly sealingly secures to the centrally apertured and externally threaded protuberance depending from the lower end of the cylindrical steel propellant chamber 22A. A firing pin 31, biased by compression spring 32 and latched upon assembly to sear pin 33, is slidably mounted in the cylindrical firing mechanism housing 34 the lower end of which is threaded for assembled securement or attachment of sear pin guide, housing and retainer 40 having threadedly secured thereto an appropriately apertured end plug 41 through which the upper end of firing lanyard 16 extends from a suitable connection to the sear pin 33.

Propellant chamber 22A, which contains propellant cartridge 22 that has a pre-formed central recess 22B in its lower end to facilitate operative rupturing by the primer gas in addition to the steel filter 35, is externally threaded for securement against O-ring seal 37A seated in a suitable groove within the threaded recess provided in the lower end of centrally apertured aluminum fitting 37. Nozzle 23 is centrally located and slidably mounted in fitting 37 and carries an O-ring seal 23A on its recessed peripheral surface which terminates with an upper or forward circular blade edge 36 for operatively puncturing the bottom of thin walled aluminum cartridge 24 containing the predetermined liquid coolant mixture 26 of water and antifreeze. The external surface of fitting 37 is threaded for securement to the cylindrical aluminum coolant cartridge chamber 39, and its upper periphery has an annular recess 37B that terminates at its upper end with a circular sharp edge 37C that facilitates puncturing the lower peripheral corners of container 24 when the latter is pressurized.

The peripherally spaced openings or ports 27 in the spreader unit coolant chamber 39 are in fluid communication with annular recess 37B and are radially arranged in a conical pattern that is inclined outwardly in a direction away from the propellant chamber 22A. The angle of inclination is predetermined such that the pressurized mixture of liquid coolant and propellant gases are directed against the parachute skirt portion 13. The upper portion of chamber 39 has an appropriate eyelet or other connector for lanyard 14.

When the drogue chute 20 opens, the firing lanyard 16 is sufficiently taut when tensioned by a predetermined load to pull the sear pin 33 and firing pin 31 downwardly a sufficient distance to unlatch the retracted or armed firing pin which then ignites primer 30. The primer gases will rupture the thin recessed wall 22B of propellant cartridge 22 to ignite the propellant charge 22. Propellant gases having sufficient pressure to break through the upper thin wall of container 22 and pass through the orifices of filter 35 before rapidly entering the orifice of nozzle 23 which is quickly forced upwardly to rupture the lower wall of liquid container 24. The pressurized mixture of liquid coolant and propellant gases will rupture the periphery of the liquid container lower wall adjacent the sharp circular edge 37C prior to being forcefully emitted through ports 27 and directed against the parachute skirt portion 13 which will facilitate a rapid opening of the parachute.

Various modifications, alterations or changes may be resorted to without departing from the scope of the invention as defined in the appended claims.

I claim:

1. In a parachute arrangement having a canopy skirt depending from a canopy apex, a drogue chute secured to said canopy apex and located externally of said canopy skirt, and a plurality of suspension lines each having one end connected to said canopy skirt and another end with means for attachment to a load, a lanyard having one end connected to said canopy apex and another end secured to a hydraulic parachute spreader, said hydraulic parachute spreader positioned internally of said parachute skirt and having a first chamber containing a cartridge of liquid coolant and having a plurality of peripherally spaced lateral orifices in a sidewall portion thereof, a second chamber in fluid communication with said first chamber and containing a cartridge of propellant charge, and an initiator secured to an end wall of said second chamber and having an actuating pin, and a firing lanyard having one end connected to said initiator actuating pin and means on the other end for attachment to said load, so constructed and arranged that upon operation of said drogue chute, said firing lanyard will actuate said initiator to ignite said propellant charge and eject liquid coolant through said orifices against said skirt.

2. The structure in accordance with claim 1 wherein said first chamber sidewall is cylindrical and said orifices are substantially radially arranged in a conical pattern that is inclined outwardly in a direction away from said second chamber.

3. The structure in accordance with claim 2 wherein said liquid coolant cartridge is a cylindrical thin walled aluminum container of a mixture of water and a predetermined amount of anti-freeze.

4. The structure of claim 1 wherein the effective length of said lanyards and said spreader is less than the effective lengths of each of said suspension lines and their corresponding collapsed parachute canopy length.

* * * * *